(12) United States Patent
Husted et al.

(10) Patent No.: US 8,494,568 B2
(45) Date of Patent: Jul. 23, 2013

(54) METHOD AND APPARATUS FOR TRANSIENT FREQUENCY DISTORTION COMPENSATION

(71) Applicant: QUALCOMM Incorporated, SanDiego, CA (US)

(72) Inventors: Paul J. Husted, San Jose, CA (US); Bevan M. Baas, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/716,030

(22) Filed: Dec. 14, 2012

(65) Prior Publication Data

US 2013/0102255 A1    Apr. 25, 2013

Related U.S. Application Data

(62) Division of application No. 13/207,376, filed on Aug. 10, 2011, now Pat. No. 8,346,288, which is a division of application No. 12/778,958, filed on May 12, 2010, now Pat. No. 8,019,369, which is a division of application No. 10/139,123, filed on May 3, 2002, now Pat. No. 7,340,265.

(60) Provisional application No. 60/360,596, filed on Feb. 28, 2002.

(51) Int. Cl.
*H04B 15/00* (2006.01)

(52) U.S. Cl.
USPC ............... 455/501; 455/63.1; 455/67.13

(58) Field of Classification Search
USPC ............ 455/63.1, 67.13, 501, 114.2, 570, 455/115.1; 375/278, 285, 296, 284
See application file for complete search history.

(56) References Cited

U.S. PATENT DOCUMENTS

| 3,825,843 A | 7/1974 | Felsberg et al. |
| 4,109,212 A * | 8/1978 | Donnell et al. ............... 327/317 |

(Continued)

FOREIGN PATENT DOCUMENTS

| EP | 0580125 A1 | 1/1994 |
| JP | 10098421 A | 4/1998 |

(Continued)

OTHER PUBLICATIONS

Elwan et al. Digitally Programmable Decibel-Linear CMOS VGA for Low-Power Mixed-Signal Applications, IEEE Transactions on Circuits and Systems—II: Analog and Digital Signal Processing, vol. 47, No. 5, May 2000.

(Continued)

*Primary Examiner* — Sonny Trinh
(74) *Attorney, Agent, or Firm* — Bever, Hoffman & Harms, LLP

(57) ABSTRACT

Transient distortion is compensated for by multiplying an exponentially-decaying phase shift onto the distorted waveform. The exponentially decaying phase shift waveform is patterned after the transient which typically takes the form of an exponential and occurs upon introduction of power to a circuit or circuit component. A digital circuit produces an appropriate exponentially decaying waveform which is used as the input for a look up table whose output is a complex sinusoidal waveform capable of compensating for the distortion. The complex sinusoid is multiplied onto the transmitted waveform. The decaying exponential is biased so that it crosses a threshold at which point the compensating circuitry is turned off.

20 Claims, 8 Drawing Sheets

U.S. PATENT DOCUMENTS

| | | | |
|---|---|---|---|
| 4,243,045 | A | 1/1981 | Maas |
| 4,323,731 | A | 4/1982 | Hershberger |
| 4,481,645 | A * | 11/1984 | Karabinis ............ 375/285 |
| 4,532,477 | A | 7/1985 | Green, Jr. et al. |
| 4,773,034 | A | 9/1988 | Debus, Jr. |
| 4,968,968 | A | 11/1990 | Taylor |
| 5,172,394 | A | 12/1992 | Kuster et al. |
| 5,291,148 | A | 3/1994 | Reisner et al. |
| 5,311,313 | A | 5/1994 | Ebihara et al. |
| 5,469,172 | A | 11/1995 | Schleder et al. |
| 5,557,640 | A | 9/1996 | Chadwick |
| 5,563,911 | A | 10/1996 | Uesugi et al. |
| 5,589,797 | A | 12/1996 | Gans et al. |
| 5,659,609 | A | 8/1997 | Koizumi et al. |
| 5,770,971 | A | 6/1998 | McNicol |
| 5,778,029 | A | 7/1998 | Kaufmann |
| 5,821,533 | A | 10/1998 | Bingham et al. |
| 5,847,603 | A | 12/1998 | Myer |
| 5,900,778 | A | 5/1999 | Stonick et al. |
| 5,903,823 | A | 5/1999 | Moriyama et al. |
| 5,963,022 | A | 10/1999 | Buda et al. |
| 6,038,262 | A | 3/2000 | Ganter |
| 6,137,831 | A | 10/2000 | Johnson |
| 6,246,865 | B1 | 6/2001 | Lee |
| 6,255,904 | B1 | 7/2001 | Capodivacca et al. |
| 6,487,261 | B2 | 11/2002 | Iwamatsu et al. |
| 6,507,628 | B1 | 1/2003 | McCallister et al. |
| 6,545,535 | B2 | 4/2003 | Andre |
| 6,552,609 | B2 | 4/2003 | Hamada et al. |
| 6,590,940 | B1 | 7/2003 | Camp, Jr. et al. |
| 6,657,493 | B2 | 12/2003 | Ode et al. |
| 6,744,317 | B2 | 6/2004 | Kim et al. |
| 6,751,447 | B1 | 6/2004 | Jin et al. |
| 6,791,302 | B2 | 9/2004 | Tang et al. |
| 6,809,607 | B2 | 10/2004 | Nagasaka |
| 6,907,025 | B2 | 6/2005 | Demir et al. |
| 6,980,604 | B2 | 12/2005 | Kubo et al. |
| 6,987,814 | B2 | 1/2006 | Iwamatsu et al. |
| 7,103,122 | B2 | 9/2006 | Suganuma |
| 7,307,473 | B2 | 12/2007 | Kusunoki et al. |
| 7,340,265 | B2 | 3/2008 | Husted et al. |
| 7,742,778 | B2 | 6/2010 | Husted et al. |
| 8,019,369 | B2 | 9/2011 | Husted et al. |
| 8,346,288 | B2 | 1/2013 | Husted et al. |
| 2004/0198263 | A1 | 10/2004 | Ode et al. |

FOREIGN PATENT DOCUMENTS

| | | |
|---|---|---|
| JP | 2001060883 A | 3/2001 |
| JP | 2001060903 A | 3/2001 |
| TW | 396675 B | 7/2000 |
| WO | 9800929 A1 | 1/1998 |
| WO | 0124554 A1 | 4/2001 |

OTHER PUBLICATIONS

International Search Report—PCT/U803/005738—International Search Authority, European Patent Office, Aug. 26, 2003.

Supplementary Partial European Search Report—EP03711250, Searching Authority, Berlin, Jan. 30, 2007.

* cited by examiner

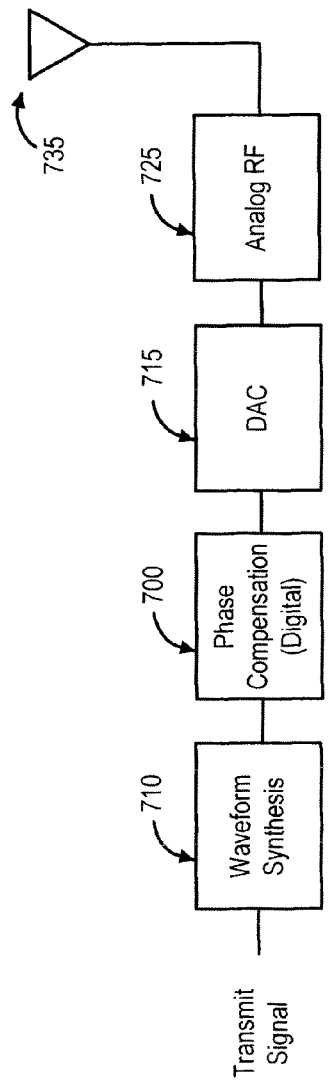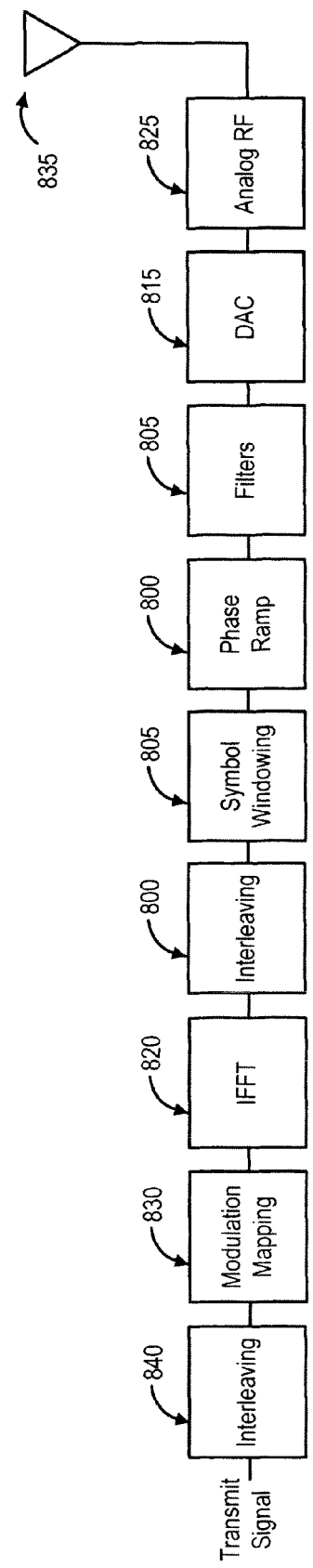

METHOD AND APPARATUS FOR TRANSIENT FREQUENCY DISTORTION COMPENSATION

RELATED APPLICATIONS

This invention is a divisional of U.S. patent application Ser. No. 13/207,376 entitled "METHOD AND APPARATUS FOR TRANSIENT FREQUENCY DISTORTION COMPENSATION," filed Aug. 10, 2011 which is a divisional of U.S. patent application Ser. No. 12/778,958 entitled "METHOD AND APPARATUS FOR TRANSIENT FREQUENCY DISTORTION COMPENSATION," filed May 12, 2010 which is a divisional of U.S. patent application Ser. No. 10/139,123 entitled "METHOD AND APPARATUS FOR TRANSIENT FREQUENCY DISTORTION COMPENSATION," filed May 3, 2002 which is a non-provisional of Provisional Application Ser. No. 60/360,596 entitled "METHOD AND APPARATUS FOR TRANSIENT FREQUENCY DISTORTION COMPENSATION," filed Feb. 28, 2002.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of Invention

The present invention relates to frequency compensation, and more particularly to frequency compensation in transmitter devices. The present invention is even more particularly related to compensating frequency by multiplying a signal to be transmitted by an exponentially decaying phase shift that matches phase shift due to power source fluctuations.

2. Discussion of Background

When large circuits are switched on or off, the surge in current drawn from the power supply causes the supply voltage to momentarily change. Some circuits are sensitive to power supply fluctuations which can cause undesirable behavior. One such circuit is the phase/frequency locked loop of an analog chip's synthesizer (e.g., a chip containing primarily analog circuits, including a synthesizer). In particular, when the transmit circuits (including the power amplifier) are turned on, a dip in the analog chip's supply voltage causes a slight perturbation in the synthesizer's lock frequency. The magnitude of the frequency error is greatest when the power amplifier is turned on and it exponentially decays to zero with a time constant on the order of 50 μs. The frequency error is imposed on the transmit waveform resulting in degraded performance caused by estimation errors in the receiver.

In the past, three primary methods have been utilized to reduce or eliminate problems caused by noisy circuits interacting with sensitive circuits:

(1) isolate the sensitive circuit's supply from the noisy circuit's supply. Unfortunately, for the case of the power amplifier and the synthesizer, both circuits are on the same die and sufficient isolation is either very difficult or impossible.

(2) time things so that the noisy circuit operates at a different time than the sensitive one. For the synthesizer/power amplifier case, this is a difficult design issue unless the power amplifier is left on for a long time. However, power amplifiers are often shut down to enhance power savings, and specifications often require the time between a transmit command and when the transmitter begins transmission to be a very short period of time, often less than 1 μs. Therefore, leaving the power amplifier on is not practical and other solutions are needed. In addition, specifications can require that the power amplifier not be left on while not transmitting a packet because the transmitted carrier leak would be unacceptable.

(3) compensate for the error elsewhere in the signal path.

Although the third solution is likely the most complex, it is the approach chosen for the synthesizer's exponentially-decaying frequency error during the beginning of a transmit packet because it is doubtful layout techniques could adequately isolate the synthesizer's supply and because leaving the power amplifier on when unused would result in unacceptably-large power dissipation.

SUMMARY OF THE INVENTION

The present inventors have realized distortion particularly frequency distortions that are transient in nature—can be compensated by multiplying an exponentially-decaying phase shift onto the distorted waveform. The exponentially decaying phase shift is a waveform patterned after the transient, which typically takes the form of an exponential and occurs upon introduction of power to a circuit or circuit component. For example, a transmitter device includes a power amplifier that disturbs a synthesizer, where the synthesizer causes a transient in an output waveform on power up. Since the transmitter typically powers up the power amplifier at the start of a transmission (e.g., a packet transmission), the transient normally only causes distortion at the start of a transmission (transients may occur at the end or other locations in the output waveform and also be similarly corrected). The exponentially decaying waveform is patterned after the transient caused by the power amplifier power up, in that when the power amplifier power up causes a large frequency shift (immediately after power up), the exponentially decaying waveform provides the greatest frequency shift in a direction that compensates for the transient. Conversely, when the frequency shift caused by power amplifier power up is at its least (further away from synthesizer power up), the exponentially decaying waveform, when multiplied onto the waveform to be transmitted, causes a lesser amount of compensatory phase shift to the waveform to be transmitted. The exponentially decaying waveform may be produced in many ways, including mathematical computation on a per-cycle basis (herein we describe a 2-tap Infinite Impulse Response (IIR) filter, but any appropriate mathematical function would be acceptable), an arbitrary waveform stored in the chip, either in a hardwired way or in a programmable memory, or a charge stored in a capacitor and released across a resistor for a decaying exponential signal in the analog domain. A step response across an inductor in series with a resistor or other equivalents can also be used. More complex analog constructs may also be implemented.

The present invention is embodied as an apparatus for compensating for signal distortion, comprising, a distortion compensating device configured to produce a compensation signal having a phase shift magnitude approximately equivalent to a magnitude of a frequency distortion occurring on a signal being transmitted, and a compensation multiplier configured to multiply the compensation signal onto the signal being transmitted.

The present invention includes a method of compensating for transient distortions of a transmitted signal, comprising the steps of, identifying a distortion of a signal to be transmitted, generating a compensation waveform corresponding to the distortion, and applying the compensation waveform to the signal to be transmitted.

Although the present invention is primarily intended to be implemented in electronic circuits, portions of both the device and method may be conveniently implemented in programming on a general purpose computer, networked computers, or microprocessor. In addition, any components of the present invention represented in a computer program, data sequences, and/or control signals may be embodied as an electronic signal broadcast (or transmitted) at any frequency in any medium including, but not limited to, wireless broadcasts, and transmissions over copper wire(s), fiber optic cable(s), and coaxial cable(s), etc.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 7 is a block diagram of a transmitter having a phase compensation block according to an embodiment of the present invention;

FIG. 8 is a block diagram of an 802.11a transmitter according to an embodiment of the present invention.

DESCRIPTION OF THE PREFERRED EMBODIMENTS

The present invention compensates for waveform distorting transients that distort waveforms by multiplying an exponentially-decaying compensatory phase shift onto the distorted waveform. The exponentially decaying waveform is patterned after the transient, which typically takes the form of an exponential transient, that occurs upon introduction of power to a circuit. A preferred application of the present invention is in a transmitter of a wireless device. However, the present invention may be applied to any device that produces a waveform that is subject to transient distortion, including, but not limited to wireline communications (e.g. over copper), SONAR, and audio (e.g. sound pre-distortion when the audio amplifier powers up).

In the wireless transmitter example, between transmissions, power amplifiers, active filters, mixers, and other high power components of the transmitter are turned off to save power. At each broadcast or transmission, these devices are powered up. However, momentary voltage drops in power supplies that supply the high power devices cause the output waveform to be momentarily distorted at the beginning of the transmission. This distortion normally causes a phase shift in output waveform. The present invention multiplies an exponentially-decaying phase shift onto the distorted waveform, effectively removing the transient-caused distortion.

Figure 1:
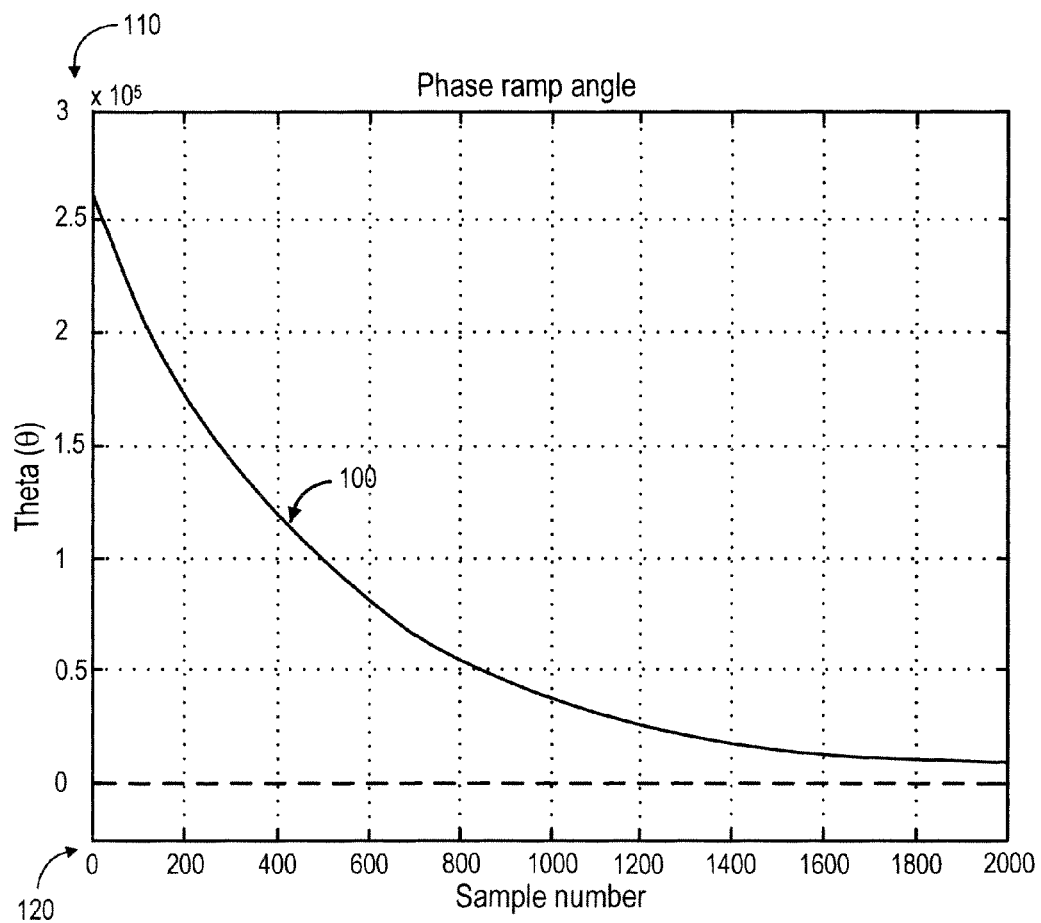
FIG. 1 is a plot for an angle correction function according to an embodiment of the present invention.

Referring now to the drawings, wherein like reference numerals designate identical or corresponding parts, and more particularly to FIG. 1 thereof, there is illustrated a plot for a typical angle correction function 100. The angle correction function 100 provides a basis for a relative amount of phase correction needed to remove a transient. The angle correction function 100 is an exponentially decaying plot of Theta ($\theta(t)$) 110 versus sample numbers 120. The sample numbers 120 represent equidistant points from which waveform samples of theta ($\theta(t)$) are taken. The graph is scaled such that $2\pi=2^{19}$ for $\theta$.

The angle correction function 100 is used to index into one of a complex exponential, sine/cosine transformation, complex sinusoid, or other time varying complex formula. Applying the angle correction function to the time varying complex formula produces a phase shifting function that is used to compensate a distorted waveform. Preferably, the complex exponential is $e^{j\theta(t)}$, which is used since the goal is to provide only a phase shift $\theta(t)$ (also referred to as phase pre-compensation). As an index into a phase shift value, the angle correction function may be any function.

The present invention may also include magnitude pre-compensation as well as phase pre-compensation. In this case, $A(t)e^{j\theta(t)}$ would be used, where $A(t)$ is a magnitude pre-compensation equation. $A(t)$ can be used alone for magnitude only compensation, and, in that case, $A(t)$ is applied via multiplication, addition, or other mathematic operations. Magnitude pre-compensation is particularly useful with power amps that often have non-instantaneous ramp-ups to full power. By multiplying (or adding) to the waveform to be transmitted by a function that corresponds to the non-instantaneous ramp-up distortion in a manner that compensates for that distortion, then, the distortion can be greatly reduced or effectively eliminated.

Figure 2:
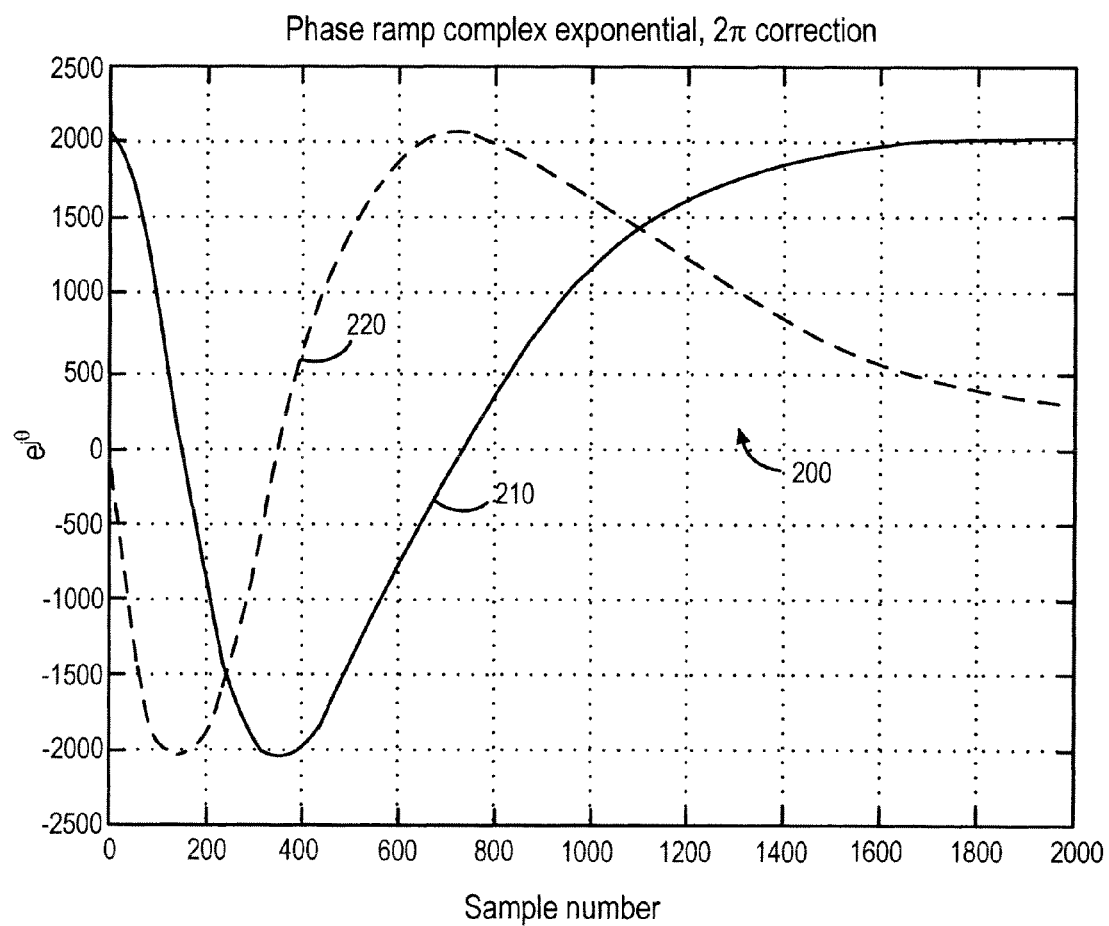
FIG. 2 is a plot of a complex phase shift 200 having both real and imaginary components derived from theta ($e^{j\theta(t)}$) according to an embodiment of the present invention.

FIG. 2 is an example plot of a complex phase shift derived from theta ($e^{j\theta(t)}$). In FIG. 2, the complex phase shift 200 includes a real part 210 and an imaginary component 220, which are represented with a magnitude of 2048 normalized to unity. For each $\theta(t)$ there exists a corresponding phase pre-compensation value. For example, at sample 400, the phase compensation value (or waveform) has a real part of approximately −2000 and an imaginary part of approximately 500 (normalized, sample 400=sqrt ((approx. 2000)$^2$+(approx. 500)$^2$)=approximately 2061, which is within an approximate normalization 2048 to unity).

In one embodiment, the present invention performs phase pre-compensation based on $\theta(t)$ being run at 40 MHz for the IEEE 802.11a short-range wireless communication standard. In other embodiments or when used with other standards, the sample rate may be varied. For example, the circuitry could be run at a faster rate with a smaller alpha or at a slower rate with a larger alpha, depending on design considerations such as speed of current digital processing in a device in which the invention is to be applied. However, the invention has been found to operate efficiently at 40 MHz, saving energy over solutions running at higher frequencies.

Figure 3:
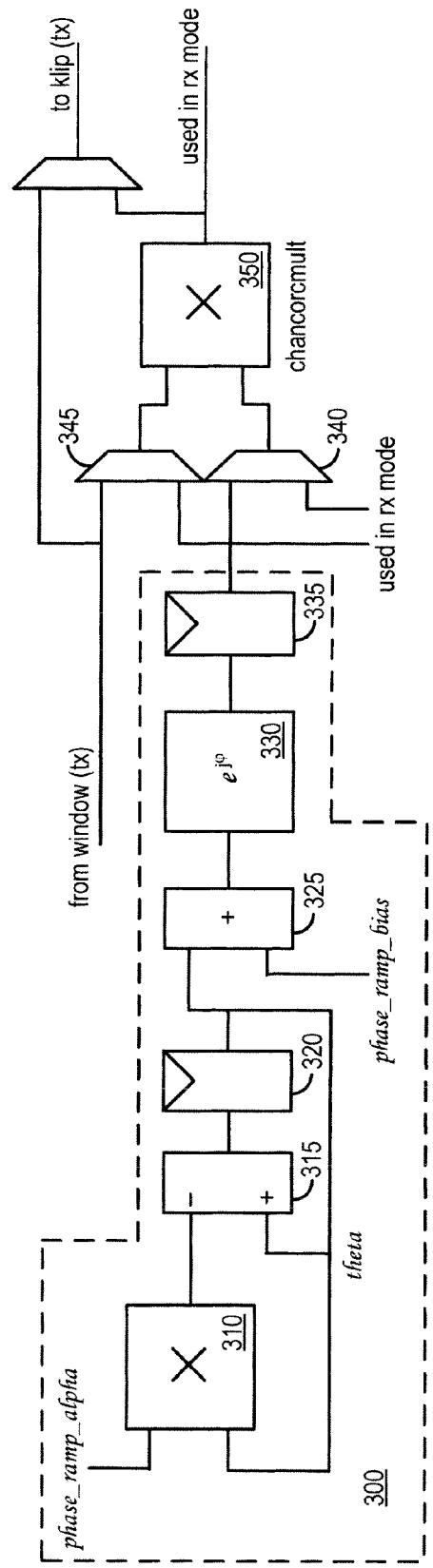
FIG. 3 is a block diagram of a phase ramp block according to an embodiment of the present invention.

Production and application of the complex phase shift 200 or an equivalent may be accomplished in a number of different ways. The present invention includes a phase ramp block, which is a device used to produce a compensated waveform to be multiplied onto a distorted waveform. FIG. 3 is a block diagram of a phase ramp block 300 according to an embodiment of the present invention. The phase ramp block 300 includes a multiplier 310, a subtractor 315, theta register 320, adder 325, look-up table 330 and output register 335.

The phase ramp block 300 operates as follows:

At the beginning of a transmit packet, theta is initialized to a programmable value specified by the configuration register 320, phase_ramp_init. Preferably, the programmable value has a range from −4 n to +4 n (the programmable range). Depending on the application, other ranges may be utilized, for example −2 n to +2 n. The range is based on the total integrated phase difference between the desired waveform and the actual, distorted waveform as determined by measurements. Preferably the integrated phase difference is for the case when the distorted waveform is more than a full cycle (2pi) early or late. For example, if the distorted waveform was initially 2 cycles off and converged exponentially to the desired waveform, we would want to start the correction circuit at 4pi, even though the directly measured phase difference would be 0 initially. The programmable range is determined by the estimated possible worst-case phase difference over different processes, temperatures, board component choices, and other tolerances.

Now, referring back to FIG. 1, using the example angle correction function 100, the phase_ramp_init corresponds to the initial angle correction at sample 0 (~2.6×10$^5$) (Note: Since 2π radians is equivalent to a value of 2^19=524288, 2.6*10^5 is about equal to pi). The phase ramp block 300 is a digital circuit, and the angle correction function theta (equal to phase_ramp_init on a first cycle) is produced at the configuration register 320 as an intermediate output and as feedback to the multiplier 310 and subtractor 315.

The multiplier 310 multiplies the feedback theta by a phase_ramp_alpha. Phase_ramp_alpha is typically set to a very small number. A typical range for phase_ramp_alpha is between 0 and $2^{-9}$, in steps of $2^{-17}$. Steps are utilized because of the quantized nature of digital processing. Ideally, there would be an unlimited choice of alpha values, but the invention includes a range of design choices and tradeoffs between the amount of flexibility in choosing the alpha and the number of bits dedicated to having the ability to set alpha either more precisely or over a broader range. Based on the transient characteristics of the device to which the present invention is applied, the actual value is determined by looking at the sampling rate and the desired θ(t) from empirical data, performing a fit for the desired value, and determining a safe range to use to be able to tolerate surprises in upcoming data without overburdening the digital design in area or power.

With each subsequent clock cycle, the multiplier product theta·phase_ramp_alpha is subtracted from theta at subtractor 315 and then stored in the register 320. The above cycles of theta and theta reduction implement a 2-tap IIR filter difference equation as follows:

theta($n$)=theta($n$−1)·(1−phase_ramp_alpha)

and produce a decaying exponential function, such as the angle correction function 100 shown in FIG. 1.

Because the "tail" of theta can go on with very little change for a long time as it approaches zero, the correction signal is calculated using theta plus a bias, phase_ramp_bias (with phase_ramp_bias typically having the opposite sign of phase_ramp_init). This way, when theta crosses zero, the entire block can be powered down and bypassed (e.g., any of idled, powered off, etc.), which can result in significant power savings since the block has been designed to dissipate very little power when idle (or insignificant/none when powered off). The actual amount of power saved depends on the shape of the required phase adjustment and each packet's length. In FIG. 3, adder 325 adds the phase_ramp_bias to the contents of register 320 to produce a biased correction signal (biased theta). The biased theta is then used to find the complex value $e^{j\Theta(t)}$ via a lookup table 330. The complex value is a phase correction signal.

Various combinations of electronic circuits, software, or other methods may be implemented to produce a correction signal that can be used to correct waveform distortion and still be consistent with the broader aspects of the present invention. For example, a time domain lookup table could be used instead of our mathematical function generation for more arbitrary compensation waveforms. A step response (or some other function) could be passed through a FIR, rather than the IIR method for θ(t) generation as described above. And, the correction signal may be produced using a software algorithm executed on a microprocessor, or by any combination of electronic circuits similarly programmed.

Figure 4:
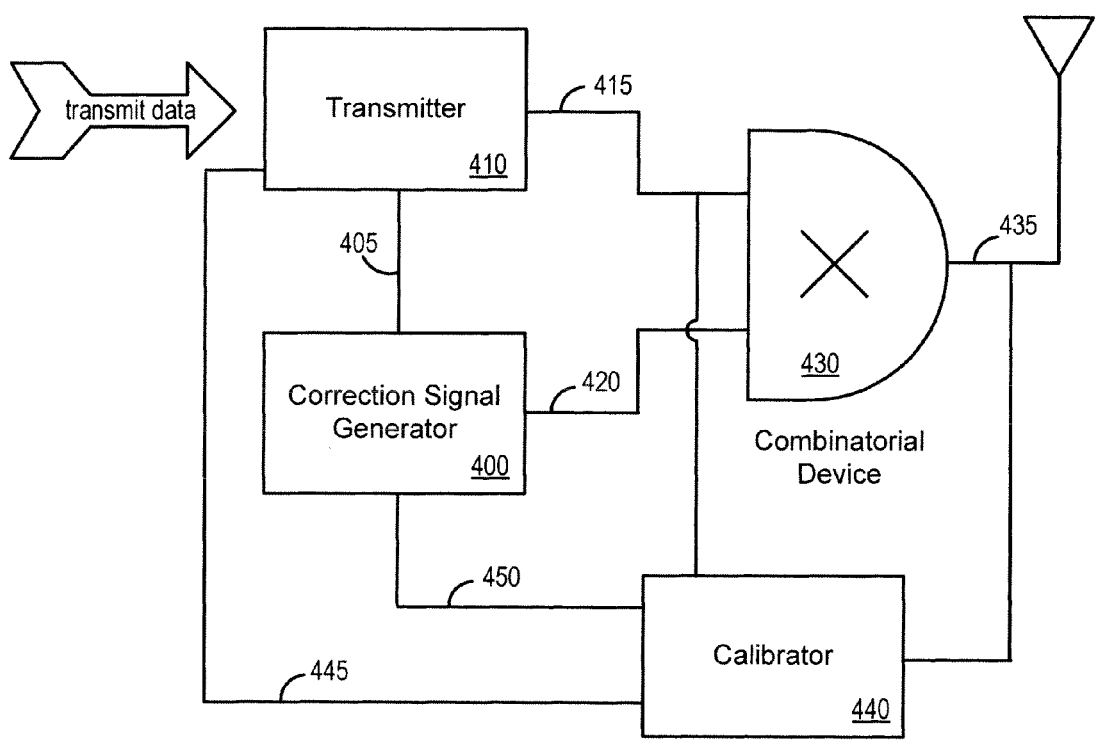
FIG. 4 is a block diagram of a transient distortion compensation device according to an embodiment of the present invention.

FIG. 4 is a block diagram of a transient distortion compensation device according to an embodiment of the present invention. A signal correction generator 400 is provided a power up signal 405. The power up signal indicates power up of one or more devices known to cause a transient frequency shift or amplitude distortion in a signal to be transmitted. The power up signal may identify a transient phase shift distortion, an amplitude distortion, or a combination of such distortions.

Upon receipt of the power-up signal, the correction signal generator 400 produces a correction signal 420 that is compensatory with respect to the one or more distortions occurring on the signal to be transmitted. The correction signal generator 400 may be any of the above described embodiments, including, but not limited to, the phase ramp components 300, a time domain lookup table, microprocessor with software programming, specifically designed electronic circuits including ASIC, RAMS, ROMs, etc, or any other device or equivalent capable of producing the correction signal.

A distortion will be initiated by the power amplifier turning on at or near, but generally slightly before, the beginning of a packet. So, when viewed very coarsely, the beginning of a packet and the beginning of the distortion can appear to happen at the same time. However, looking closer, in general, the distortion event does not occur at the same time as the start of the signal; the distortion event and the start of a signal are therefore generally de-coupled and distinct from each other. Thus, the beginning of a signal will be indicated by certain events (e.g., for transmit, it may be directly controlled by the IFFT controller but can be inferred from other signals) and the beginning of the distortion is indicated by other events. For example, in a transmitter, distortion is caused by the power amplifier being turned on, and can again be inferred from certain control (or other) signals related to the cause of the distortion (e.g., a TxStart signal). In another example, distortions at an end of a signal may be caused by a Media Access Control (MAC) device turning off before physical layer processing of a wireless signal is completed, and, for example, a MAC off signal may be utilized to indicate those distortions are occurring or are about to occur. Furthermore, although our main discussion illustrates identifying control signals that identify or associate with various causes of distortions in transmitted signals, it should be understood that many different control (or other) signals within any electronic device can be utilized to identify distortions, whether or not the signals are transmitted, received, or neither transmitted nor received.

The compensatory signal (phase correction signal) is combined with the signal to be transmitted at combinatorial device 430 prior to transmission, altering the signal to be transmitted 415 in a manner that reduces or eliminates the distortions on the transmitted signal 435. The combinatorial device itself may be any of the above described items, such as a multiplier, adder, or Coordinate Rotation Digital Computer (CORDIC) (Which may be embodied in any number of a class of shift-add algorithms for rotating vectors in a plane, the rotator performing a rotation using a series of specific incremental rotation angles selected so that each is performed by a shift and add operation). Rotation of unit vectors provides a way to accurately compute trigonometric functions, as well as a mechanism for computing the magnitude and phase angle of an input vector. Vector rotation is also useful in a host of DSP applications including modulation and Fourier Transforms), or any device or equivalent capable of combining a correction signal with a signal to be transmitted. Certain design considerations, including the type of compensatory signal produced will influence any engineering decisions as to which type of combinatorial device is utilized.

Preferably, the phase correction signal (compensatory or correction signal) (result of the lookup table) is forwarded to a complex multiplier to multiply the complex value onto the waveform being transmitted. In FIG. 3, an 8-bit by 12-bit complex multiplier inside chancorcmult 350 is shown and used to multiply the transmit waveform. by the phase correction signal, completing the phase correction operation. The chancorcmult 350 is a complex multiplier used in previous designs for OFDM frequency domain channel correction and is re-used by the present invention. However, other complex multipliers may also be used.

Previously, the chancormult was used solely for channel correction. In that role, the chancormult multiplies the frequency domain outputs of the FFT with the inverted frequency domain channel estimate for a given subcarrier. Now, the chancormult multiplier is used by the transmitter device (the chancormult block is technically in the receiver, however, because it was previously only used during receiving operations, it is available for use during transmit, which makes it an efficient choice for re-use during transmit mode) for the phase ramp pre-compensation in addition to the previous role if needed. Signal gates 340 and 345 route the transmit waveform and the phase correction signal to the complex multiplier 350 during phase ramp pre-compensation, and route appropriate signals during other times for channel correction. Thus, the present invention can be implemented by sharing components with other functional areas of the transmitter, saving die space, engineering space management effort, etc.

The chancorcmult 350 is one way of applying the phase correction signal to the signal to be transmitted. The chancorcmult 350 has advantages in that it re-uses parts in an existing design. To any extent other parts may be similarly re-used is encouraged. However, it should be understood that any method of applying the phase correction signal to the signal to be transmitted may be employed and is therefore included within the scope of the present invention. This includes a single purpose multiplier or other wave combinatorial device/devices.

Table 1 provides an example set of bits used in configuration registers holding key values for implementing the phase ramp block according to the above described embodiment of the present invention. However, alternative register configurations could be implemented as will be apparent, based on the present disclosure, to those having ordinary skill in the art.

TABLE 1

| Configuration Register | Number of bits/format | Description |
| --- | --- | --- |
| Phase_ramp_alpha | [8: alpha/2^17] | decrease rate of exponential function |
| Phase_ramp_init | [10: x*2^10] | initial value of phase ramp angle |
| phase_ramp_bias | [9: x*2^9] | phase ramp angle magnitude offset |
| phase_ramp_enabl | [1] | signal to turn on/off transient distortion correction |

Figure 5:
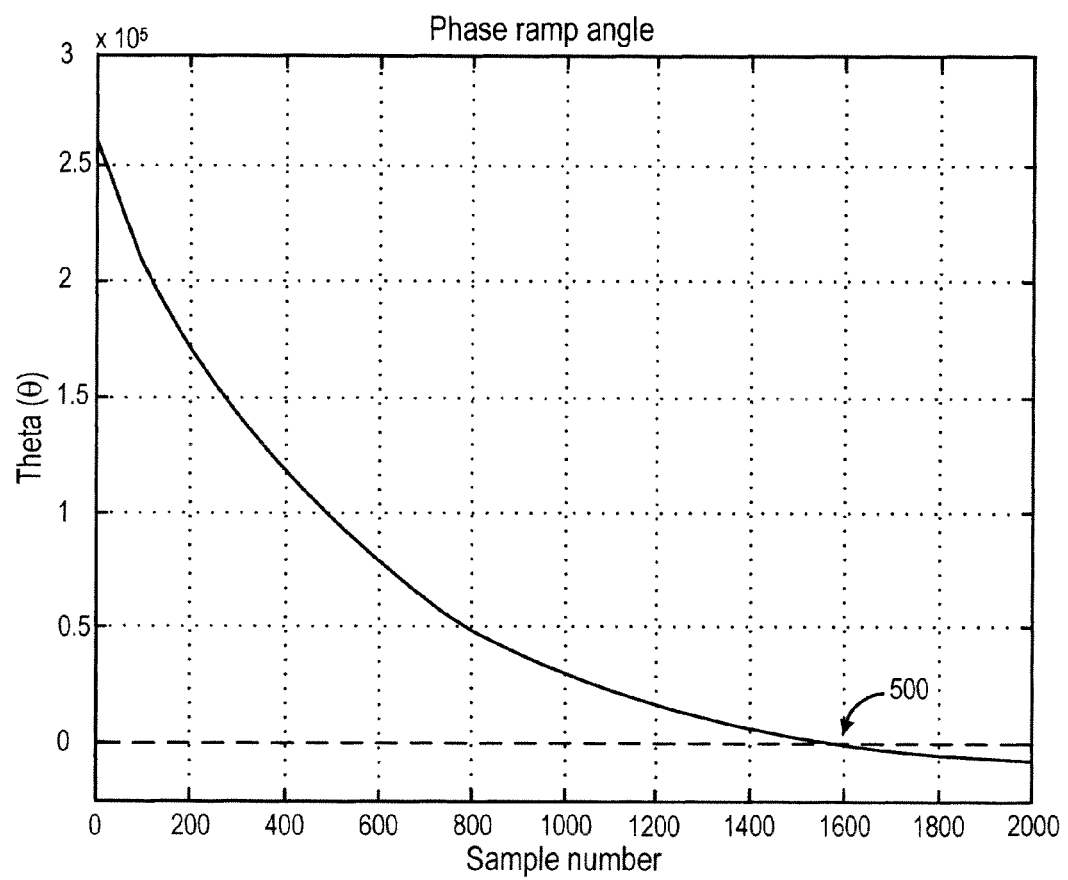
FIG. 5 is a plot of theta ($\theta(t)$) generated using a negative phase_ramp_bias according to an embodiment of the present invention.

FIG. 5 shows a graph of theta ($\theta(t)$) generated using a negative phase_ramp_bias. The graph of FIG. 5 is scaled such that $2\pi=2^{19}$ for $\theta(t)$. Starting at approximately $2.6 \times 10^5$ and decreasing with each sample by an amount equivalent to the product of phase_ramp_alpha and theta, the negative bias then causes theta to cross zero after roughly 1600 samples. In this example, at 1600 samples (reference 500), the distortion correction is turned off.

Figure 6:
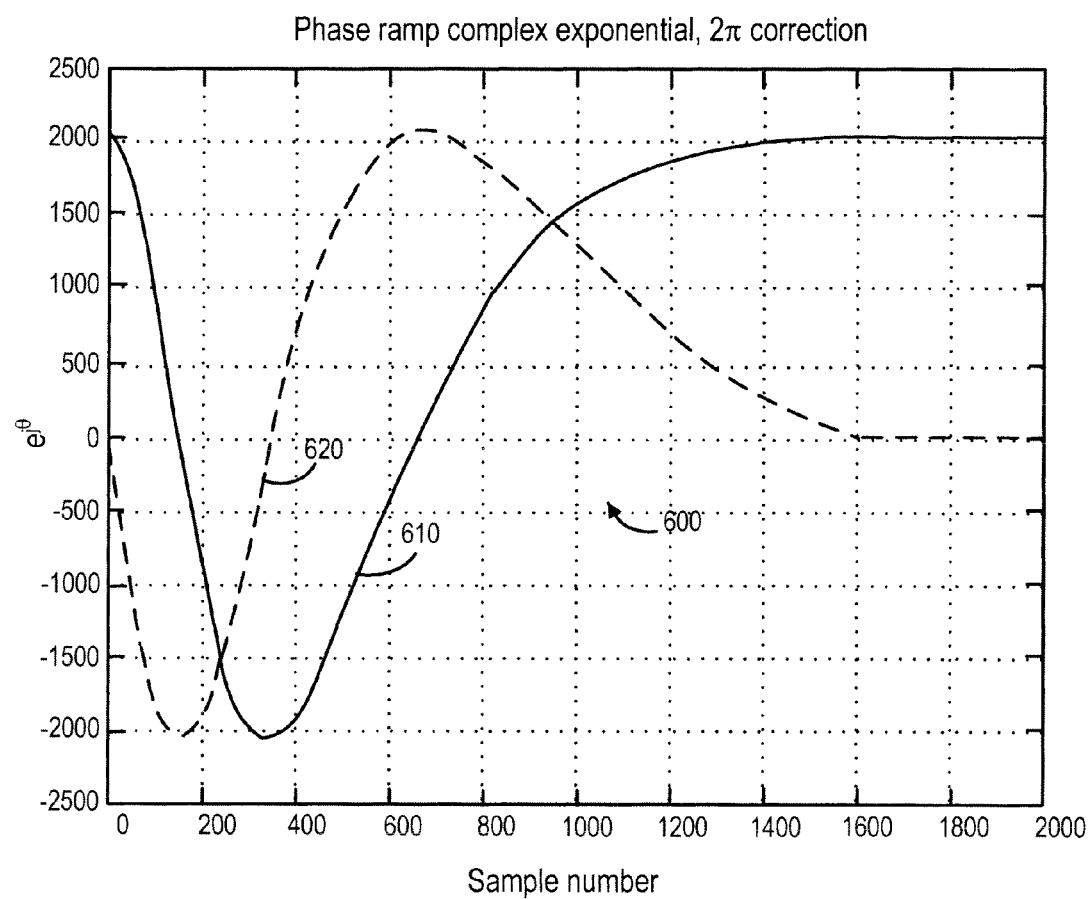
FIG. 6 is a plot of a phase shifting waveform according to an embodiment of the present invention.

FIG. 6 is a plot of a phase shifting waveform corresponding theta displayed in FIG. 5. Note how the waveforms hold the idle value (real=1.00, imag=0.00) (real=ref 610, imag=ref 620) when theta=0 after approximately 1600 samples. This example phase shifting function has a phase_ramp_bias equal to −24.

FIG. 7 is a block diagram of a transmitter having a phase compensation block 700 according to an embodiment of the present invention. The phase compensation block 700 is placed after waveform synthesis 710 and before transmission.

FIG. 8 is a block diagram of an 802.11a transmitter according to an embodiment of the present invention. Again, the phase ramp circuits 800 are placed between waveform generation and broadcast, specifically after symbol windowing 810 and prior to filters 805 and digital to analog conversion 815. This placement of the phase ramp circuits 800 allows the operations to be done at a lower frequency to save power, since the filters upsample to a higher frequency. It also allows the filters to filter out some higher order spectral effects of this operation (if any) for any necessary spectral mask requirements.

The angle correction function is derived in a case by case study for a given application. The present inventors have determined that the phase ramp was fairly constant across process variation, temperature, and frequency. This was determined by transmitting a given tone, capturing the waveform, finding the phase of the tone once it settled, and back-calculating the phase error of the signal at the beginning of the transmission.

However, if a particular application is found to be less consistent, a calibration method could be performed either as part of a manufacturing calibration that stores a result into a programmable or non-volatile memory or as part of a self-calibration by the chip. In one embodiment, self-calibration comprises transmitting a tone through the transmitter, looping through the receiver and performing a series of FFTs on the signal to determine the frequency shift over time. A more elaborate method could be used, such as comparing a known settled sinusoid (or other waveform) to a distorted waveform. The steps include inputting a known sinusoid, recording its phase after it is known to have settled (providing a baseline from which to determine proper phase at points previous to settling), recording its phase at other points of interest (e.g., the first 50 μs of a transmit, or other distortion period), and then curve fitting the recorded points of interest to an expected model based on the known sinusoid and phase to create the correct estimate of the phase distortion.

Now, referring back to FIG. 4, components of a calibration device according to an embodiment of the present invention are illustrated. A calibrator 440 provides a tone signal (calibration tone) 445 to the transmitter 410. In response, the transmitter 410 transmits the calibration tone, which is passed through combinatorial device 430 to antenna 455 for broadcast. The transmitter 410 does not send the power up signal 405.

The broadcast calibration tone is reacquired by the calibrator 440, which then measures the reacquired calibration tone and compares it to the original calibration tone (prior to transient distortions). The differences are analyzed, and mathematical data identifying one or more distortions that occur on the reacquired calibration tone are sent to the correction signal generator 400. The correction signal generator saves the mathematical data and uses it to produce future correction signals. The process may be repeated with power up signal 405 to test how well the transient distortion compensation is being performed, and additional adjustments in the correction signal generator are made based thereon.

Figure 9:
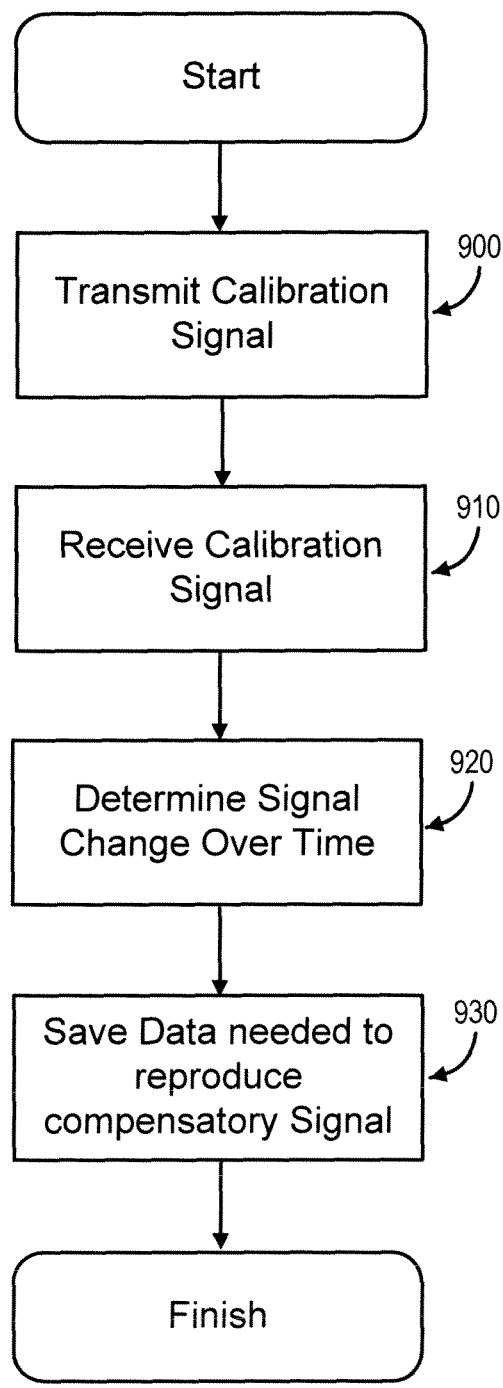
FIG. 9 is a flow chart of a calibration process according to an embodiment of the present invention.

FIG. 9 is a flow chart of a calibration process according to an embodiment of the present invention. At step 900, a calibration signal is transmitted. The transmitted signal may be a tone of steady or variable frequency. The transmitted calibration signal is received (step 910), and an amount of change of the calibration signal is determined (step 920). The change may, for example, be due to frequency distortion, amplitude (magnitude) distortion, or both.

A set of data is calculated and saved that describes the change of the calibrated signal (step 930). The set of data may be curve fitting parameters of a polynomial equation, a time varying complex formula, values of a lookup table, or other mathematical descriptors that allow a compensatory signal to be reproduced that is capable of correcting the detected change of the calibrated signal. The saved data is then utilized to produce the compensatory signal which is then applied to the signal to be transmitted under conditions similar to conditions present upon transmission of the calibration signal (e.g., power up of one or more electrical components in tandem with a transmission burst, or other conditions).

Although the present invention has been mainly described with reference to distortion occurring at the beginning of a transmit cycle, it should be apparent to the ordinarily skilled practitioner that, based on the present disclosure, the devices and processes of the present invention may be applied to other distortion types and causes, including, but not limited to, disturbances caused by mechanical or electrical events, or effects of those events, that occur during a transmission, reception, or production of a signal. The distortions may be caused by a transmitter and corrected at the a receiver, or caused by a transmitter and corrected at the transmitter, or any other caused at the receiver and corrected at the receiver. Furthermore, the distortions corrected are not limited to transmitters and/or receivers but may be caused in device, the only requirement being that the distortion has some sort or predictability (e.g., a DVD drive that may have a distortion caused by spin up of its motor). The distortions corrected may be exponentially decreasing as shown above, or may follow other mathematically reproducible functions. The distortions may originate from any source, including, but not limited to, on/off transitions of circuits (including, but not limited to large or small circuits whether integrated of discrete, on-chip or off-chip, etc.), any second order responses, complex exponentials, by-products of electronic circuit operations, transients from unrelated sources, power supply fluctuations, substrate currents, magnetic fields, electric fields, and/or any transient or disturbance from any source that has the effect of causing a frequency distortion and has features that allow it to be identified and compensated.

Furthermore, the present invention has mainly been described as compensating frequency distortions in a transmitter device, however, in many circumstances, most notably in which a limited number or types of transmitters are utilized in a system, frequency distortion compensation according to the present invention may be performed in a receiver device. The process changes in that it is the received signal on which the compensation signal is combined. Thus, a signal detector, or packet detector, detects when a signal is first being received. The signal detector signals generation of a compensation signal which is combined with the incoming signal. The corrected signal is then processed as normal by the receiver.

In the case where a single type of transmitter is utilized to send the received signals (e.g., a peer-to-peer system), the characteristics of the transmitter are known and a single compensation signal is produced/re-produced by the receiver. In the case where multiple transmitter devices may communicate with the receiver, the receiver looks at the beginning of a received signal (e.g., packet preamble) and determines what type of transmitter is transmitting the received signal. A lookup table or other repository contains coefficients or other characteristics of the transmitter or received signal from which the compensation signal is produced. Alternatively, the entire compensation signal itself is stored in the repository (the repository itself may be any memory or storage device either internal or external to the device performing the compensation). Whether stored or produced, the compensation signal is then combined with the received signal.

In one embodiment, a buffer is implemented to store a signal being received. The stored signal is then analyzed to determine the distortion. Based on the distortion, a compensation signal is produced and applied to the stored signal and any additional incoming parts of the stored signal. Alternatively, the stored portion of the signal is discarded and the compensation is applied to other parts of the signal as it is being received.

Compensation at the receiver also allows for compensation for any frequency offset between oscillators of the transmitter and receiver. For example, in the buffer embodiment, multiple estimates of the frequency offset over time are produced by, for example, tracking of pilot carriers or any method that provides different snapshots of what the frequency offset was over time. The differences in offset over time is used to determine the form and extent of the transient and the frequency offset. An appropriate compensation signal is then calibrated and applied to the distorted/offset signal.

The application of different compensation signals to transients in signals from different transmitters is also well suited to a TDMA type systems where specific transmitters are provided a time slot in which to transmit. Upon receiving a signal in a certain time slot, the receiver applies a compensation signal corresponding to that certain time slot to the incoming signal.

Distortion caused by a receiver may also be corrected by applying any one or more processes or devices of the present invention within the receiver. Furthermore, transients or other distortions corrected by the present invention may originate in a transmitter, a receiver, or any device, and, the transients are corrected in any device in which those distortions are present, whether or not the signal carrying the distortion was transmitted, received, or neither transmitted nor received.

In addition, the present invention and any of the processes and devices described above may be applied to synthesized signals whether or not they are transmitted or received. Thus, the invention may be applied to any signal in which a transient can be identified. The present invention may be implemented in analog circuitry and/or digitally controlled analog circuitry, or any combination of analog and digital components. For example, a digital signal processor may be implemented to detect or measure a level of distortion, and then select a capacitor value, or select and charge on a capacitor that adjusts a level of compensation applied to the signal (a digital analog example).

The present invention may also be implemented in programming running on high speed digital computers or microprocessors programmed according to the teachings of the present disclosure, as will be apparent to those skilled in the computer art.

Appropriate software coding can readily be prepared by ordinarily skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMS, micro-drive, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, production and/or uploading of complex waveform tables (e.g., $e^{j\Theta(t)}$), producing phase correction signals, looking up or calculating tabular values, multiplying waveforms, transmitting and receiving electronic signals, including calibration tones or waveforms, etc.

Obviously, numerous modifications and variations of the present invention are possible in light of the above teachings. It is therefore to be understood that within the scope of the appended claims, the invention may be practiced otherwise than as specifically described herein.

The invention claimed is:

1. An apparatus for compensating for signal distortion, the apparatus comprising:
    a distortion compensating device configured to produce a compensation signal having a phase shift magnitude approximately equivalent to a magnitude of a frequency distortion occurring on a signal being transmitted, the signal being a time-varying, information-bearing signal; and
    a compensation multiplier configured to multiply the compensation signal onto the signal being transmitted for a limited time,
    wherein said frequency distortion is an exponentially decaying phase shift distortion.

2. The apparatus of claim 1, wherein the distortion compensating device includes a digital signal processor.

3. The apparatus of claim 1, wherein the distortion compensating device comprises analog circuitry.

4. The apparatus of claim 3, wherein the distortion compensating device comprises a digitally controlled analog circuit.

5. The apparatus of claim 1, wherein the compensation multiplier comprises a digital signal processor.

6. The apparatus of claim 1, wherein the compensation multiplier comprises analog circuitry.

7. The apparatus of claim 6, wherein the compensation multiplier comprises a digitally controlled analog circuit.

8. The apparatus of claim 1, further comprising a receiver that accesses the compensation multiplier to implement channel correction.

9. The apparatus of claim 1, further comprising a calibrator coupled to the compensation multiplier and the distortion compensating device, wherein the calibrator receives a signal from the compensation multiplier, and in response, provides information used by the distortion compensating device to produce the compensation signal.

10. An apparatus for compensating for signal distortion, the apparatus comprising:
    means for producing a compensation signal having a phase shift magnitude approximately equivalent to a magnitude of a frequency distortion occurring on a signal being transmitted, the signal being a time-varying, information-bearing signal; and
    means for multiplying the compensation signal onto the signal being transmitted for a limited time, wherein said frequency distortion is an exponentially decaying phase shift distortion.

11. A method of compensating for transient distortions of a time-varying, information-bearing signal, the method comprising:
    identifying a distortion of the time-varying, information-bearing signal;
    generating a compensation waveform corresponding to the distortion, the compensation waveform including an exponentially-decaying phase shift; and
    applying the compensation waveform to the time-varying, information-bearing signal.

12. The method according to claim 11, wherein the time-varying, information-bearing signal is internal to an electronic device and the distortion is caused by the electronic device.

13. The method according to claim 11, wherein identifying the distortion includes identifying a control signal related to a source of the distortion.

14. The method according to claim 13, wherein identifying the distortion includes identifying a control signal indicating a start of a distortion causing event.

15. The method according to claim 14, wherein the distortion causing event is a power-up of an amplifier.

16. The method according to claim 11, wherein identifying the distortion includes identifying a Transmit (Tx) start signal.

17. The method according to claim 11, wherein identifying the distortion includes identifying a start of the time-varying, information-bearing signal.

18. The method according to claim 11, further comprising:

determining a transmitter type that is broadcasting the time-varying, information-bearing signal, wherein generating the compensation waveform includes generating the compensation waveform based on the transmitter type.

19. The method according to claim 18, wherein determining the transmitter type includes buffering a received signal and analyzing the buffered signal to determine a distortion pattern in the buffered signal that identifies the transmitter type.

20. An apparatus for compensating for transient distortions of a time-varying, information-bearing signal, the apparatus comprising:

means for identifying a distortion of the time-varying, information-bearing signal;

means for generating a compensation waveform corresponding to the distortion, the compensation waveform including an exponentially-decaying phase shift; and means for applying the compensation waveform to the time-varying, information-bearing signal.

* * * * *